United States Patent
Laslo

(10) Patent No.: US 9,321,006 B2
(45) Date of Patent: Apr. 26, 2016

(54) OXIDATION CONTROL FOR IMPROVED FLUE GAS DESULFURIZATION PERFORMANCE

(75) Inventor: Dennis James Laslo, Ten Mile, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/469,620

(22) Filed: May 11, 2012

(65) Prior Publication Data

US 2013/0298762 A1 Nov. 14, 2013

(51) Int. Cl.
| | |
|---|---|
| *B01D 53/34* | (2006.01) |
| *B01D 53/50* | (2006.01) |
| *B01J 19/00* | (2006.01) |
| *C01F 11/48* | (2006.01) |

(52) U.S. Cl.
CPC ............ *B01D 53/346* (2013.01); *B01D 53/501* (2013.01); *B01D 2251/11* (2013.01); *B01D 2257/302* (2013.01); *B01J 19/00* (2013.01); *B01J 19/0006* (2013.01); *C01F 11/48* (2013.01)

(58) Field of Classification Search
CPC .. B01D 53/346; B01D 53/501; Y10T 436/18; Y10T 436/00; B01J 19/0033; B01J 19/006; B01J 19/00; B01J 2219/00164; B01J 2219/00049; C01F 11/48; C01F 11/46
USPC ...................... 436/119; 423/155, 1
See application file for complete search history.

(56) References Cited

U.S. PATENT DOCUMENTS

| | | | |
|---|---|---|---|
| 3,940,742 A | 2/1976 | Hudspeth et al. | |
| 4,108,959 A | 8/1978 | Tatani et al. | |
| 4,675,167 A | 6/1987 | Shinoda et al. | |
| 5,560,893 A | 10/1996 | Okino et al. | |
| 6,010,664 A * | 1/2000 | Johnson ................. | G01N 21/79 422/105 |
| 6,029,100 A | 2/2000 | Iwashita et al. | |
| 6,594,553 B1 | 7/2003 | Johnson et al. | |
| 7,887,769 B1 | 2/2011 | Smith | |
| 2006/0047347 A1* | 3/2006 | Boyden et al. ................. | 700/19 |

FOREIGN PATENT DOCUMENTS

| | | |
|---|---|---|
| EP | 0224627 A1 | 6/1987 |
| EP | 0780151 A1 | 6/1997 |

(Continued)

OTHER PUBLICATIONS

European Search Report dated Sep. 20, 2013 for EP Application No. 13166856.8.

(Continued)

*Primary Examiner* — Christine T Mui

(74) *Attorney, Agent, or Firm* — Rita D. Vacca

(57) ABSTRACT

A system and method for controlling oxidation of sulfites in a slurry. The system includes a tank having an inlet for receiving a slurry used in wet flue gas desulfurization. The tank also includes an inlet for receiving a gas. The inlet for receiving the gas is configured so that at least a portion of the gas received in the tank is dispersed through at least a portion of the slurry received in the tank. A sensor is configured to measure a sulfite concentration $S_1$ of the slurry received in the tank. In some embodiments, the sensor is a sulfite analyzer. In other embodiments, the sensor is a virtual analyzer. The system includes a controller. Software executing on the controller generates a signal indicative of an adjustment of a flow rate of gas into the tank based at least in part on the sulfite concentration $S_1$.

15 Claims, 2 Drawing Sheets

(56) References Cited

FOREIGN PATENT DOCUMENTS

| EP | 1 040 864 | * | 3/2000 | ............ B01D 53/64 |
|---|---|---|---|---|
| EP | 1040864 | A2 | 10/2000 | |
| EP | 2578292 | A1 | 4/2013 | |
| EP | 2578544 | A1 | 4/2013 | |
| GB | 2159508 | A | 12/1985 | |
| JP | S62225227 | | 10/1987 | |
| JP | S63137734 | | 6/1988 | |
| JP | H0372912 | | 3/1991 | |
| JP | H07-16425 | | 1/1995 | |
| JP | H08-66613 | | 3/1996 | |
| JP | 2005-087828 | | 4/2005 | |
| WO | 96/14137 | | 5/1996 | |
| WO | 2013/050990 | | 4/2013 | |

OTHER PUBLICATIONS

Japanese Decision of Refusal—dated Sep. 16, 2014, for JP Appln. No. 2013-100868.
Appeal Decision issued from Japanese Patent Office dated Dec. 21, 2015 for JP Application No. 2013-100868.
United States Office Action—Final Rejection for U.S. Appl. No. 14,736,787 dated Jan. 12, 2016.

* cited by examiner

OXIDATION CONTROL FOR IMPROVED FLUE GAS DESULFURIZATION PERFORMANCE

FIELD

This present disclosure relates to a system and method for controlling a portion of a wet flue gas desulfurization process. More particularly, the present disclosure relates to a system and method for controlling the rate of oxidation of sulfites during a wet flue gas desulfurization process.

BACKGROUND

Gas-liquid contactors, also referred to as absorbers, are capable of removing substances such as gases and particulate matter from flue gases produced by power plants. Sulfur dioxide ($SO_2$), for example, is produced by the combustion of fossil fuels. Sulfur dioxide emissions are of a particular concern because they are known to be hazardous to the environment. Wet flue gas desulfurization is a process in which sulfur dioxide is removed from flue gas in the most common process, by contact with an alkaline slurry using a spray tower.

Wet flue gas desulfurization typically uses calcium-based slurries, or sodium-based or ammonia based solutions to contact flue gases and remove sulfur dioxide therefrom. A slurry is a mixture of solids and liquid. Examples of calcium-based slurries include limestone (calcium carbonate; $CaCO_3$) slurries and lime (calcium oxide; CaO). Such slurries react with acidic gases to form precipitates which can be collected for disposal or recycling. Contact between the alkaline slurry and acidic gases which are present in the flue gases, such as sulfur dioxide, result in the absorption of at least a portion of the acidic gases by the slurry.

After the desulfurization process, the slurry is typically accumulated in a tank, where the sulfur dioxide reacts with water to produce sulfites ($SO_3^{-2}$). The sulfites further react with oxygen coming from aeration air bubbled into the slurry to produce sulfates ($SO_3^{-4}$). This process may be referred to as forced oxidation. Disassociation of the lime or limestone within the slurry provides calcium ions which react with the sulfates to produce gypsum ($CaSO_4^{-2}H_2O$). The gypsum can be resold and used, for example, in the home construction industry. Forced oxidation of the slurry received in the tank by aeration ensures that all of the sulfites will be reacted to form sulfates, and thereby maximize the production of gypsum.

A disadvantage of known aeration processes is that is difficult to control oxidation of the sulfite slurry received in the tank since it is difficult to measure or estimate the dissolved sulfite concentration. As a result, it is typical to provide more than a sufficient amount of air into the tank to ensure that generally all of the sulfite are oxidized. Providing the additional pressurized air can reduce the efficiency of the power plant because energy is required to generate the pressurized air. Another disadvantage with known systems is that providing excessive levels of air to the slurry oxidizes essentially all of the sulfites to form sulfates and any benefits arising from sulfites not oxidized is lost.

SUMMARY

According to aspects illustrated herein, a system for controlling oxidation of sulfites in a slurry is disclosed. The system includes a tank having an inlet for receiving a slurry used in wet flue gas desulfurization. The tank also includes an inlet for receiving a gas. The inlet for receiving the gas is configured so that at least a portion of the gas received in the tank is dispersed through at least a portion of the slurry received in the tank. A sensor is configured to measure a sulfite concentration $S_1$ of the slurry received in the tank. In some embodiments, the sensor is a sulfite analyzer. In other embodiments, the sensor is a virtual analyzer. The system includes a controller. Software executing on the controller generates a signal indicative of an adjustment of a flow rate of gas into the tank based at least in part on the sulfite concentration $S_1$.

According to other aspects illustrated herein, a method for controlling oxidation of sulfites in a slurry is disclosed. The method includes the steps of receiving a slurry in a tank, the slurry comprising one or more sulfites. A flow of gas is provided into the slurry received in the tank. Next, the sulfite concentration $S_1$ of the slurry received in the tank is measured. The flow rate of gas being provided to the slurry received in the tank is adjusted based at least in part on $S_1$.

DESCRIPTION

Figure 1:
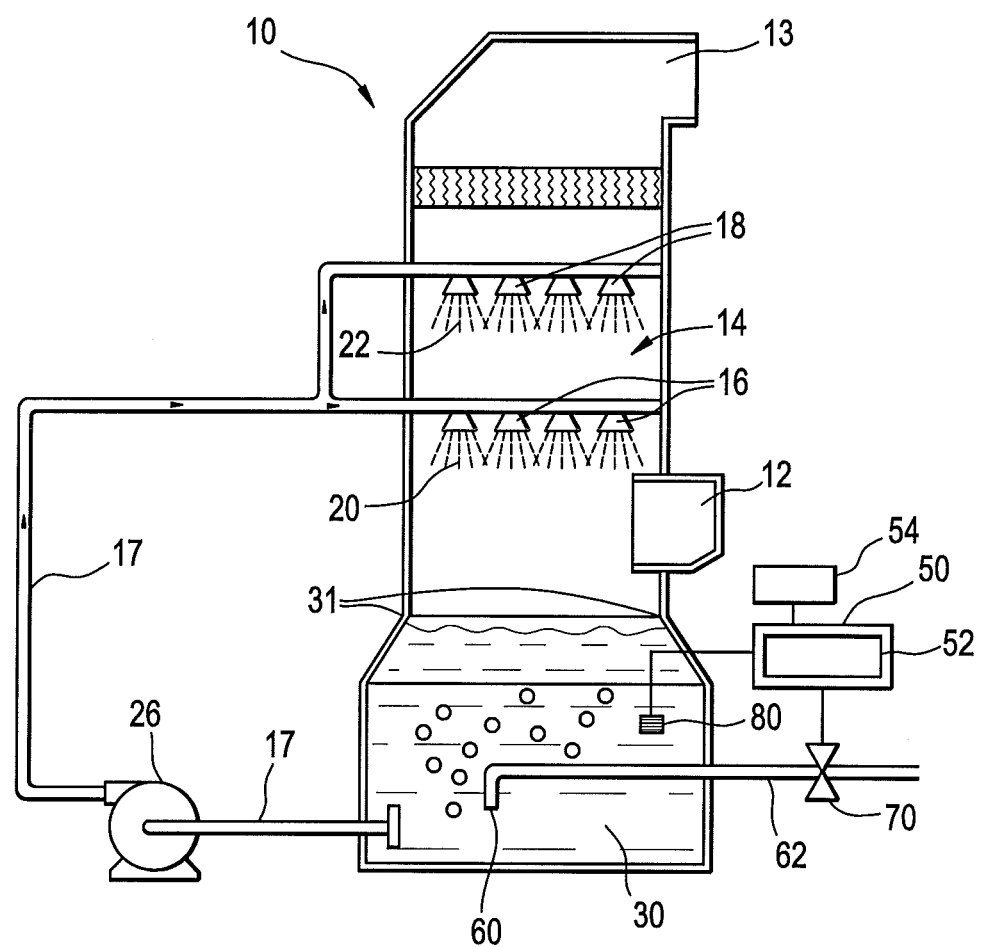
FIG. 1 is a cross-sectional view of spray tower.

In reference to FIG. 1, a spray tower 10 in accordance with the present disclosure is shown. The spray tower 10, also referred to as an absorber, is an example of a gas-liquid contactor. It should be understood that the present disclosure is not limited to a spray tower as other types of gas-liquid contactors can be employed. This disclosure, for example, can readily be applied to scrubbing structures, and operations which serve to remove undesirable gases, mist, dust, fumes, smoke and/or particulate matter from a stream of gas. Although the disclosed system and method are described in relation to a specific embodiment of a spray tower, the disclosed systems and methods are not limited in this regard. For example, the disclosed system and method can be adapted to account for variations in the design of the spray tower 10, the operating conditions of the spray tower, and the properties of the slurry being used in the spray tower, among other variables. Additionally, the disclosed system can be used with other types of absorbers, including, but not limited to, tray towers and fountain spray towers. To the extent specific dimensions, values, or specific operating conditions are included in this description, they are provided to broadly illustrate the system and method and are not intended to limit the scope of this disclosure.

The spray tower 10 is generally an upright structure defining a tower cavity 14. The tower cavity 14 is in fluid communication with an inlet 12 for receiving flue gases into the tower cavity 14. The flue gases may be generated, for example, during the combustion of one or more fossil fuels. The tower cavity 14 includes a first bank of spray headers 16 above the flue gas inlet 12. The first bank of spray headers 16 provide a spray 20 of an alkaline slurry into the tower cavity 14. The tower 10 includes a second bank of spray headers 18 above the first bank of spray headers 16. The second bank of spray headers 18 also provide a spray 22 of an alkaline slurry into the tower cavity 14. Although embodiment shown in FIG. 1 is disclosed as having a first row of spray headers 16 and a second row of spray headers 18, the present disclosure is not limited in this regard, and the number of spray headers, and rows thereof, in the tower 10 may vary for a given application.

During operation of the spray tower 10, alkaline slurry is sprayed from the first row of spray headers 16 and the second row of spray headers 18. At least a portion of that slurry flows downward in the tower cavity 14. It should be understood that the term flow, as used herein, can also refer to a drifting or settling action of an atomized slurry in the spray tower 14. As the slurry flows downward in the tower cavity 14 it contacts flue gases flowing upward in the tower cavity 14. The slurry is received in a tank 30 typically at the base of the spray tower 10. The tank 30 is in fluid communication with the first row of spray headers 16 and second row of spray headers 18 through one or more conduits 17. A pump 26, in fluid communication with the conduit 17 and the spray headers 16, 18 pumps slurry from the tank 30, through the one or more conduits 17, and to the first and second row of spray headers 16, 18. It should be understood that the present disclosure is not limited to this specific configuration, and that different configurations of the conduits 17, pump 26, and spray headers 16, 18 are possible.

During processing in the spray tower 10, sulfur dioxide in the flue gas will react with the calcium carbonate-rich slurry (limestone and water) to form calcium sulfite, thereby removing the sulfur dioxide, or at least a portion thereof, from the flue gas and forming a transformed slurry comprising calcium sulfite. The cleaned flue gas is exhausted from the spray tower 10 through an outlet 13. The resulting transformed slurry is received in the tank 30. The tank 30 and the spray tower 10 typically reside in a single structure, for example as shown in FIG. 1, with no physical separation between them. It should be understood that the present disclosure is not limited in this regard and the tank and the spray tower may reside, for example, in distinct structures.

Figure 2:
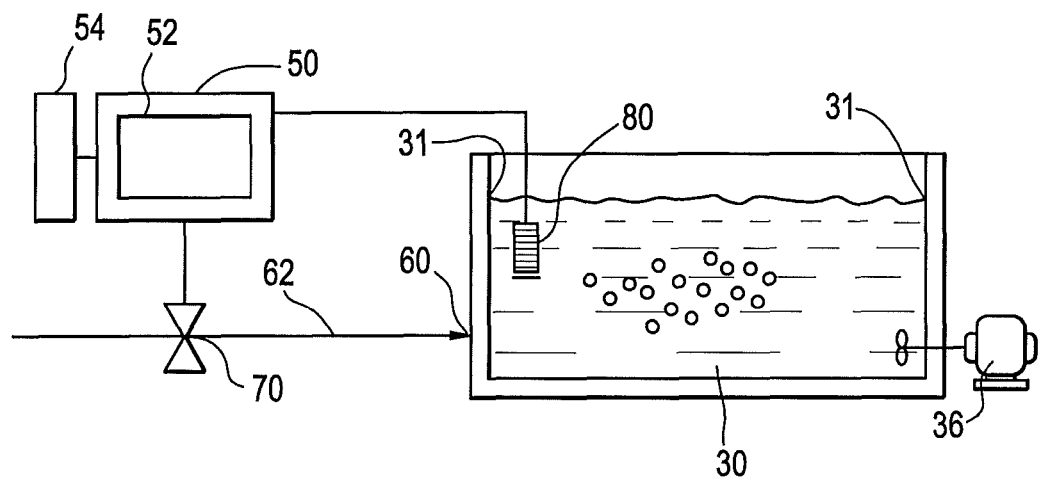
FIG. 2 is a cross-sectional view of a forced oxidation system for use with the spray tower shown in FIG. 1.

FIG. 2 is a view of the tank 30 of the spray tower 10 of FIG. 1. The tank 30 receives slurry from the spray tower 10 as the transformed slurry flows downward. The tank 30 includes an inlet 31 for receiving the transformed slurry. In the embodiment shown in FIG. 2, the inlet 31 is defined by the cross-section of the tower cavity 14 at which the transformed slurry is received in the tank 30. It should be understood that the present disclosure is not limited in this regard. For example, in some embodiments the inlet may comprise a conduit that is in fluid communication with the tower cavity 14 and the tank 30.

Figure 3:
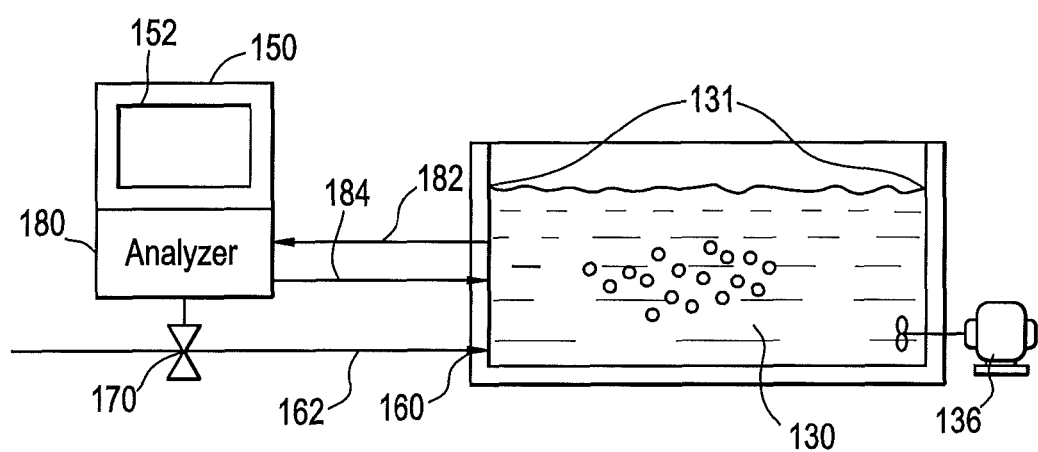
FIG. 3 is a cross-sectional view of a forced oxidation system for use with the spray tower shown in FIG. 1.

The tank 30 includes an inlet 60 for receiving a gas. The inlet 60 is in fluid communication with a conduit 62 for providing the gas. In the embodiment shown in FIGS. 1-3, the inlet 60, 160 is located below a static fluid line of the slurry received by the tank 30. This configuration allows at least a portion of the gas received in the tank 30 to be dispersed through at least a portion of the slurry received in the tank. A source of pressurized gas (not shown in the FIGS.) is in fluid communication with the conduit 62. The source of gas may be, for example, a blower capable of providing air at a continuous pressure, or a variable pressure, above atmospheric pressure. The air comprises oxygen for oxidation of the sulfites in the slurry. The tank 30 further includes an agitator 36 for distributing the oxygen received through the inlet 60 and the slurry received in the tank 30. It should be understood that although the embodiments shown in FIGS. 1-3 include an agitator 36, 136, the disclosure is not limited in this regard and the disclosed system or method can be practiced without an agitator.

In reference to FIGS. 1-2, the system includes a controller 50. The term controller 50, as used herein, generally refers to one or more devices capable of executing software. As can be appreciated by a person of ordinary skill in the art, many different devices are available for use as the controller 50. For example, one or more processor based computers can be used as a controller 50. The controller 50 includes an interface 54 for inputting information indicative of a desired operating condition of the spray tower 10. For example, a predetermined sulfite content of the slurry in the spray tower 10 can by input in to the controller 50 via the interface 54. The interface 54 is in communication with the controller 50. Although the controller 50 and the interface 54 are disclosed as separate elements in FIGS. 1-2 and an interface is not shown in FIG. 3, the present disclosure is not limited in this regard. As can be appreciated by a person of ordinary skill in the art, the interface 54 may comprise a component of the controller 50. In yet other embodiments, it is not necessary to include an interface 54. In such embodiments, predetermined parameters can be programmed into the controller 50, or can be transmitted to the controller 50 by some other means.

The system further includes at least one sulfite sensor 80 for measuring a sulfite content of the slurry received in the tank 30. The sulfite sensor 80 is positioned in the slurry received in the tank 30. The sulfite sensor 80 is configured to measure the sulfite content of the slurry received in the tank 30. The sulfite sensor 80 transmits a signal indicative of the sulfite content of the slurry to the controller 50. Based on the received signal, software 52 executing on the controller 50 determines the sulfite content of the slurry received in the tank 30. The combination of the sulfite sensor 80 and the controller 50 can be referred to as a sulfite analyzer. In some embodiments, the sulfite analyzer can provide real time measurements of the sulfite content of the slurry received in the tank 30. In further embodiments, the sulfite analyzer can provide real time and continuous measures of the sulfite content of the slurry received in the tank 30.

Although FIGS. 1 and 2 disclose that the sulfite sensor 80 is positioned inside the slurry tank 30, the present disclosure is not limited in this regard. For example, in reference to FIG. 3, the sulfite sensor 180 may be positioned outside of the slurry tank 130. The sulfite sensor 180 is in communication with the tank 130 by a first conduit 182 and a second conduit 184. Slurry is pumped through the first conduit 182, past the sulfite analyzer 180, through the second conduit 184, and back into the tank 130. The slurry tank 130 includes an agitator 136. The embodiment shown in FIG. 3 also includes a controller 150, software 152 executing thereon, an inlet 160 and a conduit 162 for providing pressurized air to the slurry received in the tank 130 and a valve 170 for controlling the flow of air. A sulfite analyzer in accordance with the present invention is disclosed in European application EP 11184432.0 titled, "Sulphite Sensor and Method for Measuring Sulphite Concentration in a Substance," having Alstom reference number W08-085-0EP. That document, and in the information disclosed therein, is incorporated by reference herein in its entirety. In some embodiments, a virtual sulfite analyzer is used to measure the sulfite content of the slurry received in the tank. An example of such a virtual analyzer is disclosed in U.S. Pat. No. 7,113,835 to Boyden et al. That reference is incorporated herein by reference.

During operation, the system controls the rate of oxidation of the sulfite in slurry received in the tank 30, 130 by adjusting the valve 70, 170 between the open and closed position to control the flow rate of oxygen into the slurry received in the tank 30, 130. As discussed above, a predetermined sulfite content is received in the controller 50, 150, for example via the interface 54, 154. The sulfite sensor 80, 180 measures a sulfite content $S_1$ in the slurry received in the tank. Software 52, 152 executing on the controller 50, 152 generates a signal indicative of an adjustment of the flow rate of gas into the tank 30 based in part on the sulfite content $S_1$. For example, if $S_1$ is less than the predetermined sulfite content, software 52, 152 executing on the controller generates a signal indicating that the valve should be adjusted open, thus providing more oxygen to the slurry and increasing the rate of oxidation thereof. Conversely, if $S_1$ is greater than the predetermined sulfite content, software 52, 152 executing on the controller 50, 150 generates a signal indicating that the valve 70, 170 should be adjusted closed, thus providing less oxygen to the slurry and decreasing the rate of oxidation. To the extent that the predetermined sulfite content is equivalent to $S_1$, software 150, 152 executing on the controller will generate a signal indicating that no adjustment is necessary to the valve 70, 170. After the signal is generated, it is transmitted to the valve 70, 170 which is then adjusted accordingly. In this way the disclosed system and method can precisely control the rate of oxidation of the slurry received in the tank 30, 130.

In some embodiments of the present disclosure, it is preferred that the predetermined oxidation rate is less than 100% of the sulfite contained in the slurry. It has been found that the presence of at least some sulfites in the slurry enhances the absorption of sulfur dioxide in the spray tower 14. If some level of sulfites could be maintained in the slurry, the dissolved alkalinity of the slurry would be enhanced, thereby increasing the removal of sulfur dioxide from the slurry by reacting sulfur dioxide with the sulfites to form bisulfite ($HSO_3^-$). In turn, more efficient removal of sulfur dioxide from the slurry In some embodiments, it is possible to increase dissolved sulfite concentrations in the slurry by additions a cation, such as magnesium. Typically, the cation is added in excess of inert anions in the slurry, such as chlorides, which accumulate with the cation instead of sulfites. gypsum. Increased levels of dissolved sulfite within the slurry can be permitted without causing limestone binding by adding salts of ammonia, sodium or magnesium to the slurry 32.

The present disclosure further relates to a method of controlling the rate of oxidation of sulfites in a slurry. The method includes the steps of receiving a slurry in a tank 30, the slurry comprising one or more sulfites. A gas flow is provided in to the tank 30. Next, the sulfite concentration $S_1$ is measured in the slurry received in the tank. Is some embodiments, this step is performed using sulfite analyzer. In other embodiments, this step is performed using a virtual analyzer. Next, the gas flow into the tank 30 is adjusted based on $S_1$.

Although the present disclosure has been described with reference to certain embodiments thereof, it should be noted that other variations and modifications may be made, and it is intended that the following claims cover the variations and modifications within the true scope of the disclosure.

What is claimed is:

1. A system for controlling oxidation of sulfites in a slurry, comprising:
    a tank having an inlet for receiving a slurry and an inlet for receiving a gas, the inlet for receiving the gas configured so that at least a portion of the gas received in the tank is dispersed through at least a portion of the slurry received in the tank;
    a sulfite concentration measuring sensor arranged in contact with the slurry received in the tank to real time measure a sulfite concentration $S_1$ of the slurry received in the tank to obtain a real time sulfite concentration $S_1$ measurement transmitted by the sulfite concentration measuring sensor as a signal to a controller;
    software executing on the controller for generating a signal indicative of an adjustment of a flow rate of gas into the tank based at least in part on the sulfite concentration measuring sensor transmitted real time sulfite concentration $S_1$ measurement to maintain a predetermined less than 100% oxidation rate for increased sulfur dioxide removal; and
    an inlet operative for supplying ammonia, sodium or magnesium cations to the slurry to achieve a slurry alkalinity for bisulfite formation therein.

2. The system of claim 1, wherein the signal is further based on a predetermined sulfite concentration of the slurry.

3. The system of claim 2, wherein the gas comprises oxygen.

4. The system of claim 3, wherein the slurry is received from a spray tower configured to perform wet flue gas desulfurization.

5. The system of claim 4, wherein the sulfite concentration measuring sensor comprises a sulfite analyzer.

6. The system of claim 4, wherein the sulfite concentration measuring sensor comprises a virtual analyzer.

7. The system of claim 1, wherein the inlet for supply of cations to the slurry is arranged in the tank.

8. A method of controlling the rate of oxidation of sulfites in a slurry comprising the steps of:
    receiving a slurry in a tank, the slurry comprising one or more sulfites;
    providing a flow of a gas into the tank;
    measuring real time a sulfite concentration $S_1$ of the slurry received in the tank with a sulfite concentration measuring sensor arranged in contact with the slurry received in the tank to obtain a real time sulfite concentration $S_1$ measurement;
    adjusting a flow rate of the gas into the tank based on the real time sulfite concentration $S_1$ measurement transmitted as a signal from the sulfite concentration measuring sensor to a controller to maintain a predetermined less than 100% oxidation rate; and
    supplying ammonia, sodium or magnesium cations to the slurry through an inlet to achieve a slurry alkalinity for bisulfite formation therein.

9. The method of claim 8, wherein the adjustment of the flow rate of the gas is further based on a predetermined sulfite concentration of the slurry.

10. The method of claim 9, wherein the sulfite concentration measuring sensor includes a sulfite analyzer used to real time measure the sulfite concentration $S_1$.

11. The method of claim 10, wherein the oxidation of sulfites in the slurry received in the tank is less than 100% for increased sulfur dioxide removal.

12. The method of claim 11, wherein the cations supplied to the slurry increases the concentration of dissolved sulfites in the slurry for improved flue gas $SO_2$ removal therewith.

13. The method of claim 12, wherein the cation comprises magnesium.

14. The method of claim 13, wherein the gas comprises oxygen.

15. The method of claim 8, wherein the sulfite concentration measuring sensor comprises a virtual analyzer.

* * * * *